United States Patent
Sandler et al.

(10) Patent No.: US 9,792,535 B2
(45) Date of Patent: *Oct. 17, 2017

(54) AUTOMATIC IMAGE PRODUCT CREATION FOR USER ACCOUNTS COMPRISING LARGE NUMBER OF IMAGES

(71) Applicant: Shutterfly, Inc., Redwood City, CA (US)

(72) Inventors: Roman Sandler, Haifa (IL); Alexander M. Kenis, Kiryat Motzkin (IL)

(73) Assignee: Shutterfly, Inc, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,846

(22) Filed: Nov. 8, 2016

(65) Prior Publication Data

US 2017/0053185 A1    Feb. 23, 2017

Related U.S. Application Data

(63) Continuation of application No. 14/932,378, filed on Nov. 4, 2015, now Pat. No. 9,519,826, which is a continuation-in-part of application No. 14/699,604, filed on Apr. 29, 2015, now Pat. No. 9,495,617, which is a continuation-in-part of application No. (Continued)

(51) Int. Cl.
| | |
|---|---|
| *G06K 9/00* | (2006.01) |
| *G06K 9/62* | (2006.01) |
| *G06T 11/60* | (2006.01) |
| *G06K 9/66* | (2006.01) |
| *G06F 17/30* | (2006.01) |

(52) U.S. Cl.
CPC ............. *G06K 9/627* (2013.01); *G06F 17/30* (2013.01); *G06K 9/00* (2013.01); *G06K 9/00221* (2013.01); *G06K 9/00281* (2013.01); *G06K 9/00677* (2013.01); *G06K 9/622* (2013.01); *G06K 9/6215* (2013.01); *G06K 9/6267* (2013.01); *G06K 9/66* (2013.01); *G06T 11/60* (2013.01)

(58) Field of Classification Search
None
See application file for complete search history.

(56) References Cited

U.S. PATENT DOCUMENTS

| | | |
|---|---|---|
| 8,385,971 B2 | 2/2013 | Rhoads |
| 8,503,739 B2 | 8/2013 | Bourdev |

(Continued)

*Primary Examiner* — Sumati Lefkowitz
*Assistant Examiner* — David Perlman
(74) *Attorney, Agent, or Firm* — Xin Wen

(57) ABSTRACT

A computer-implemented method of grouping faces in large user account for creating an image product includes adding the face images obtained from an image album in a user's account into a first chunk; if the chunk size of the first chuck is smaller than a maximum chuck value, keeping the face images from the image album into the first chunk; otherwise, automatically separating the face images from the image album into a first portion and one or more second portions; keeping the first portion in the first chunk; automatically moving the second portions to subsequent chunks; automatically grouping face images in the first chunk to form face groups; assigning the face groups to known face models associated with the user account; and creating a design for an image-based product based on the face images in the first chunk associated with the face models.

19 Claims, 6 Drawing Sheets

Related U.S. Application Data

14/272,809, filed on May 8, 2014, now Pat. No. 9,280,701.

(56) References Cited

U.S. PATENT DOCUMENTS

| | | |
|---|---|---|
| 2009/0028393 A1* | 1/2009 | Kim .................. G06F 17/30247 382/118 |
| 2009/0252383 A1 | 10/2009 | Adam |
| 2011/0038512 A1 | 2/2011 | Petrou |
| 2011/0211736 A1 | 9/2011 | Krupka |
| 2011/0293188 A1 | 12/2011 | Zhang |
| 2011/0307423 A1 | 12/2011 | Shotton |
| 2013/0051684 A1* | 2/2013 | Chen .................. H04N 1/00132 382/209 |

* cited by examiner

AUTOMATIC IMAGE PRODUCT CREATION FOR USER ACCOUNTS COMPRISING LARGE NUMBER OF IMAGES

TECHNICAL FIELD

This application relates to technologies for automatically creating image-based products, and more specifically, to creating image-based products that best present people's faces.

BACKGROUND OF THE INVENTION

In recent years, photography has been rapidly transformed from chemical based technologies to digital imaging technologies. Images captured by digital cameras can be stored in computers and viewed on display devices. Users can also produce image prints based on the digital images. Such image prints can be generated locally using output devices such an inkjet printer or a dye sublimation printer or remotely by a photo printing service provider. Other products that can be produced using the digital images can include photo books, photo calendars, photo mug, photo T-shirt, and so on. A photo book can include a cover page and a plurality of image pages each containing one or more images. Designing a photobook can include many iterative steps such as selecting suitable images, selecting layout, selecting images for each page, selecting backgrounds, picture frames, overall Style, add text, choose text font, and rearrange the pages, images and text, which can be quite time consuming. It is desirable to provide methods to allow users to design and produce image albums in a time efficient manner.

Many digital images contain people's faces; creating high-quality image products naturally requires proper consideration of people faces. For example the most important and relevant people such as family members should have their faces be shown in image products while strangers' faces should be minimized. In another example, while pictures of different faces at a same scene can be included in an image-based product, the pictures of a same person at a same scene should normally be filtered to allow the best one(s) to be presented in the image product.

Faces need to be detected and group based on persons' identities before they can be properly selected and placed in image products. Most conventional face detection techniques concentrate on face recognition, assuming that a region of an image containing a single face has already been detected and extracted and will be provided as an input. Common face detection methods include: knowledge-based methods; feature-invariant approaches, including the identification of facial features, texture and skin color; template matching methods, both fixed and deformable; and appearance based methods. After faces are detected, face images of each individual can be categorized into a group regardless whether the identity of the individual is known or not. For example, if two individuals Person A and Person B are detected in ten images. Each of the images can be categorized or tagged one of the four types: A only; B only, A and B; or neither A nor B. Algorithmically, the tagging of face images require training based one face images of known persons (or face models), for example, the face images of family members or friends of a user who uploaded the images.

To save users' time, technologies have been developed by Shutterfly, Inc. and others to automatically create image products using users' images. These automatic methods are facing increasing challenges as people take more and more digital photos. A person or a family can easily take thousands of photos in an average vacation trip. A user often has hundreds of thousands to even millions of photos in his or her account. Automatic sorting, analyzing, grouping, and laying out such a great number photos in the correct and meaningful manner are an immense task.

There is still a need for more accurate methods to accurately group face images for different persons and incorporate the face images in image products.

SUMMARY OF THE INVENTION

The present application discloses computer implemented methods that automatically categorize face images that belong to different persons. The methods are based on the statistics of the face images to be categorized, and do not require prior retraining with known people' faces or supervision during the grouping of face images. Acceptance criteria in the methods are based on probabilistic description and can be adjusted. The disclosed methods are applicable to different similarity functions, and are compatible with different types of face analyses and face descriptors.

Furthermore, the present application discloses robust and accurate methods that can automatically sort and group images in a user account that includes a large number of photos comprising a large number of face images that are difficult to be processed using conventional technologies. The disclosed method is scalable to the size of user account. The disclosed methods of grouping of a large number of face images are not limited by the number of photos per account and are applicable to the increasingly larger user accounts in the future.

The disclosed method is compatible to different face grouping techniques including methods based on training faces of known persons.

The disclosed methods are cognitive and flexible because they can adapt to properties of the large user account. The disclosed methods can accurately determine which faces are relevant to the owner of the user account and which faces may be only acquaintances or strangers. The disclosed methods allow learning and knowledge accumulation on even less frequently appearing friends and family members to be grouped and recognized, and used in image product creation. The disclosed methods also effectively remove faces of strangers and acquaintances which significantly increase computation efficiency in face grouping.

In a general aspect, the present invention relates to a computer-implemented method of grouping faces in large user account for creating an image product. The method includes: acquiring face images from an image album in a user's account by a computer processor; adding the face images obtained from the image album into a first chunk; comparing chuck size of the first chunk with a maximum chuck value for an optimal chunk size range by the computer processor; if the chunk size of the first chuck is smaller than the maximum chuck value, keeping the face images from the image album in the first chunk; if the chunk size of the first chuck is larger than the maximum chuck value, automatically separating, by the computer processor, the face images from the image album into a first portion and one or more second portions; keeping the first portion in the first chunk to keep the current chunk size below the maximum chuck value; automatically moving the one or more second portions of face images to one or more subsequent chunks by the computer processor; automatically grouping face images in the first chunk by the computer processor to form face groups; assigning at least some of the face groups in the first chunk to known face models associated with the user account; and creating a design for an image-based product based at least in part on the face images in the first chunk associated with the face models.

Implementations of the system may include one or more of the following. The computer-implemented method can further include setting up new face models by the computer processor for at least some of the face groups that cannot be assigned to existing face models, wherein the design for an image-based product can be created based on the face images associated with the known face models and the new face models. The computer-implemented method can further include moving the ungrouped face images in the first chunk to one or more subsequent chunks that have not been processed with face grouping. The computer-implemented method can further include discarding ungrouped face images that have been moved to subsequent chunks for more than a predetermined number of times. The computer-implemented method can further include repeating steps from acquiring face images in the image album or additional image albums to automatically grouping face images, to group images in a second chunk subsequent to the first chunk; assigning at least some of the face groups in the second chunk to known face models associated with the user account; and creating the design for the image-based product based at least in part on the face images in the first chunk and the second chunk associated with the face models. The step of automatically grouping face images in the first chunk can include: calculating similarity functions between pairs of face images in the first chunk by the computer processor; joining face images that have values of the similarity functions above a predetermined threshold into a hypothetical face group, wherein the face images in the hypothetical face group hypothetically belong to a same person; conducting non-negative matrix factorization on values of the similarity functions in the hypothetical face group to test truthfulness of the hypothetical face group; and identifying the hypothetical face group as a true face group if a percentage of the associated similarity functions being true is above a threshold based on the non-negative matrix factorization. The computer-implemented method can further include rejecting the hypothetical face group as a true face group if a percentage of the associated similarity functions being true is below a threshold. The step of conducting non-negative matrix factorization can include: forming a non-negative matrix using values of similarity functions between all different pairs of face images in the hypothetical face group, wherein the non-negative matrix factorization is conducted over the non-negative matrix. The similarity functions in the hypothetical face group can be described in a similarity distribution function, wherein the step of non-negative matrix factorization outputs a True similarity distribution function and a False similarity distribution function. Every pair of face images in the hypothetical face group has a similarity function above the predetermined threshold. The computer-implemented method can further include joining two true face groups to form a joint face group; conducting non-negative matrix factorization on values of similarity functions in the joint face group; and merging the two true face groups if a percentage of the associated similarity functions being true is above a threshold in the joint face group. The step of automatically grouping face images in the first chunk can include: receiving an initial set of n* face groups in the face images in the first chunk, wherein n* is a positive integer bigger than 1; training classifiers between pairs of face groups in the initial set of face groups using image-product statistics; classifying the plurality of face images by $n*(n*-1)/2$ classifiers to output binary vectors for the face images by the computer processor; calculating a value for an improved similarity function using the binary vectors for each pair of the face images; and grouping the face images in the first chunk into modified face groups based on values of the binary similarity functions by the computer processor. The computer-implemented method can further include comparing a difference between the modified face groups and the initial face groups to a threshold value, wherein the image product is created based at least in part on the modified face groups if the difference is smaller than the threshold value. There can be an integer m number of face images in the plurality of face images, wherein the step of classifying the plurality of face images by $n*(n*-1)/2$ classifiers outputs m number of binary vectors. The face images can be grouped into modified face groups using non-negative matrix factorization based on values of the improved similarity functions. The step of assigning at least some of the face groups in the first chunk to known face models can include: storing training faces associated with the known face models of known persons in a computer storage; joining the face images in the first chunk with a group of training faces associated with the known face models; calculating similarity functions between pairs of the face images or the training faces in the joint group by a computer processor; conducting non-negative matrix factorization on values of the similarity functions in the joint face group to test truthfulness of the joint face group; and identifying the face images in the first chunk that belong to the known face models if a percentage of the associated similarity functions being true is above a threshold based on the non-negative matrix factorization. The computer-implemented method can further include merging the face images with the training faces of the known face model to form a new set of training faces for the known face model. The step of conducting non-negative matrix factorization can include: forming a non-negative matrix using values of similarity functions between all different pairs of the face images and the training faces in the joint face group, wherein the non-negative matrix factorization is conducted over the non-negative matrix. The similarity functions in the joint face group can be described in a similarity distribution function, wherein the step of non-negative matrix factorization outputs a True similarity distribution function and a False similarity distribution function. The step of identifying can include comparing the similarity distribution function to the True similarity distribution function and the False similarity distribution function.

These and other aspects, their implementations and other features are described in detail in the drawings, the description and the claims.

DETAILED DESCRIPTION OF THE INVENTION

Figure 1:
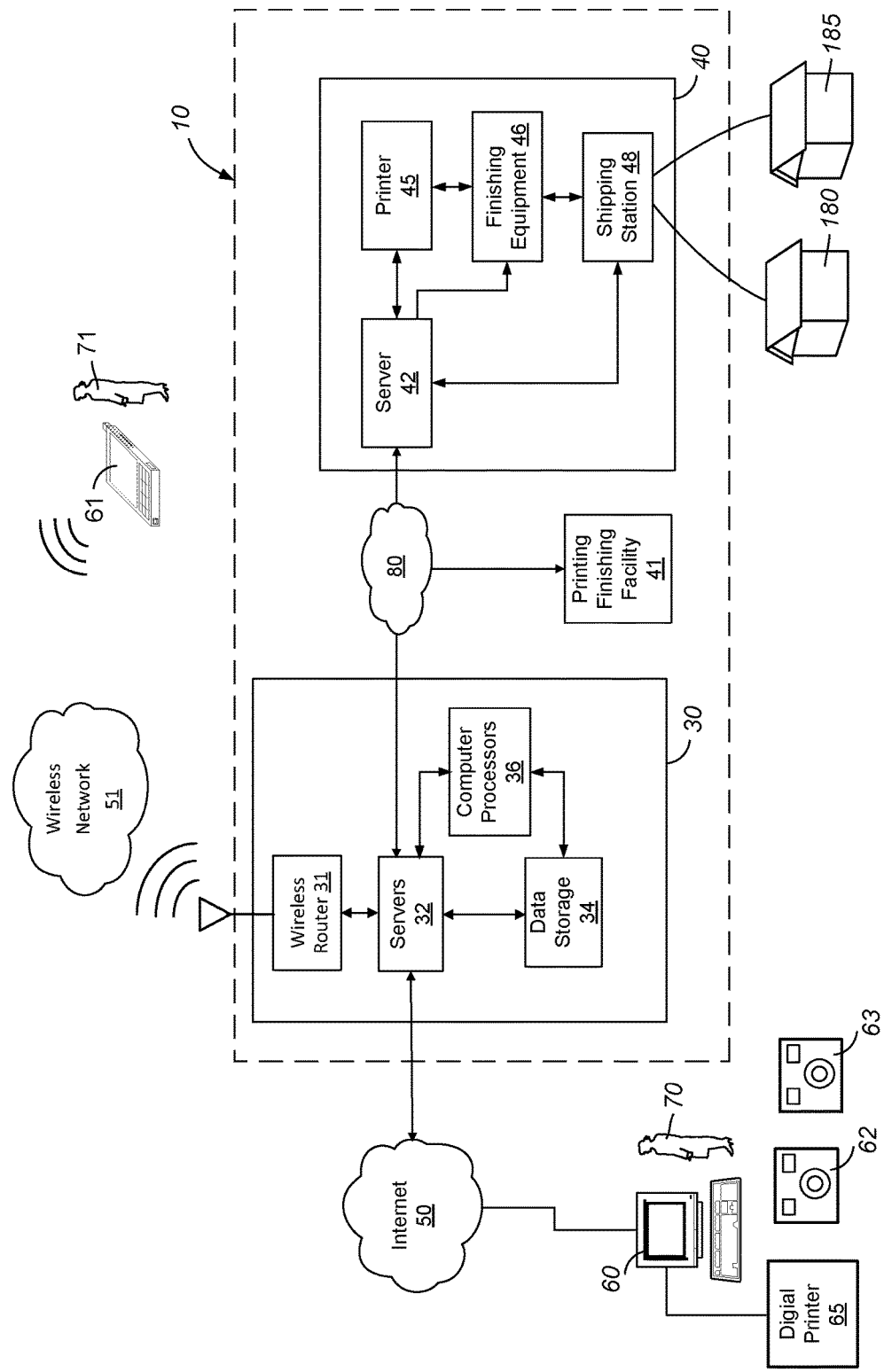
FIG. 1 is a block diagram for a network-based system for producing personalized image products, image designs, or image projects compatible with the present invention.

Referring to FIG. 1, a network-based imaging service system 10 can enable users 70, 71 to organize and share images via a wired network or a wireless network 51. The network-based imaging service system 10 is operated by an image service provider such as Shutterfly, Inc. Optionally, the network-based imaging service system 10 can also fulfill image products ordered by the users 70, 71. The network-based imaging service system 10 includes a data center 30, one or more product fulfillment centers 40, 41, and a computer network 80 that facilitates the communications between the data center 30 and the product fulfillment centers 40, 41.

The data center 30 includes one or more servers 32 for communicating with the users 70, 71, a data storage 34 for storing user data, image and design data, and product information, and computer processor(s) 36 for rendering images and product designs, organizing images, and processing orders. The user data can include account information, discount information, and order information associated with the user. A website can be powered by the servers 32 and can be accessed by the user 70 using a computer device 60 via the Internet 50, or by the user 71 using a wireless device 61 via the wireless network 51. The servers 32 can also support a mobile application to be downloaded onto wireless devices 61.

The network-based imaging service system 10 can provide products that require user participations in designs and personalization. Examples of these products include the personalized image products that incorporate photos provided by the users, the image service provider, or other sources. In the present disclosure, the term "personalized" refers to information that is specific to the recipient, the user, the gift product, and the occasion, which can include personalized content, personalized text messages, personalized images, and personalized designs that can be incorporated in the image products. The content of personalization can be provided by a user or selected by the user from a library of content provided by the service provider. The term "personalized information" can also be referred to as "individualized information" or "customized information".

Personalized image products can include users' photos, personalized text, personalized designs, and content licensed from a third party. Examples of personalized image products may include photobooks, personalized greeting cards, photo stationeries, photo or image prints, photo posters, photo banners, photo playing cards, photo T-shirts, photo mugs, photo aprons, photo magnets, photo mouse pads, a photo phone case, a case for a tablet computer, photo key-chains, photo collectors, photo coasters, photo banners, or other types of photo gift or novelty item. The term photobook generally refers to as bound multi-page product that includes at least one image on a book page. Photobooks can include image albums, scrapbooks, bound photo calendars, or photo snap books, etc. An image product can include a single page or multiple pages. Each page can include one or more images, text, and design elements. Some of the images may be laid out in an image collage.

The user 70 or his/her family may own multiple cameras 62, 63. The user 70 transfers images from cameras 62, 63 to the computer device 60. The user 70 can edit, organize images from the cameras 62, 63 on the computer device 60. The computer device 60 can be in many different forms: a personal computer, a laptop, or tablet computer, a mobile phone etc. The camera 62 can include an image capture device integrated in or connected with in the computer device 60. For example, laptop computers or computer monitors can include built-in camera for picture taking. The user 70 can also print pictures using a printer 65 and make image products based on the images from the cameras 62, 63. Examples for the cameras 62, 63 include a digital camera, a camera phone, a video camera capable of taking motion and still images, a laptop computer, or a tablet computer.

Images in the cameras 62, 63 or stored on the computer device 60 and the wireless device 61 can be uploaded to the server 32 to allow the user 70 to organize and render images at the website, share the images with others, and design or order image product using the images from the cameras 62, 63. The wireless device 61 can include a mobile phone, a tablet computer, or a laptop computer, etc. The wireless device 61 can include a built-in camera (e.g. in the case of a camera phone). The pictures taken by the user 71 using the wireless device 61 can be uploaded to the data center 30. If users 70, 71 are members of a family or associated in a group (e.g. a soccer team), the images from the cameras 62, 63 and the mobile device 61 can be grouped together to be incorporated into an image product such as a photobook, or used in a blog page for an event such as a soccer game.

The users 70, 71 can order a physical product based on the design of the image product, which can be manufactured by the printing and finishing facilities 40 and 41. A recipient receives the physical product with messages from the users at locations 180, 185. The recipient can also receive a digital version of the design of the image product over the Internet 50 and/or a wireless network 51. For example, the recipient can receive, on her mobile phone, an electronic version of the greeting card signed by handwritten signatures from her family members.

The creation of personalized image products, however, can take considerable amount of time and effort. In some occasions, several people may want to contribute to a common image product. For example, a group of people may want or need to jointly sign their names, and write comments on a get-well card, a baby-shower card, a wedding-gift card. The group of people may be at different locations. In particular, it will be desirable to enable the group of people to quickly write their names and messages in the common image product using mobile devices.

The images stored in the data storage 34 (e.g. a cloud image storage), the computer device 60, or the mobile device 61 can be associated with metadata that characterize the images. Examples of such data include image size or resolutions, image colors, image capture time and locations, image exposure conditions, image editing parameters, image borders, etc. The metadata can also include user input parameters such as the occasions for which the images were taken, favorite rating of the photo, keyword, and the folder or the group to which the images are assigned, etc. For many image applications, especially for creating personalized image products or digital photo stories, it is beneficial to recognize and identify people's faces in the images stored in the data storage 34, the computer device 60, or the mobile device 61. For example, when a family photobook is to be created, it would very helpful to be able to automatically find photos that include members within that family.

Figure 2:
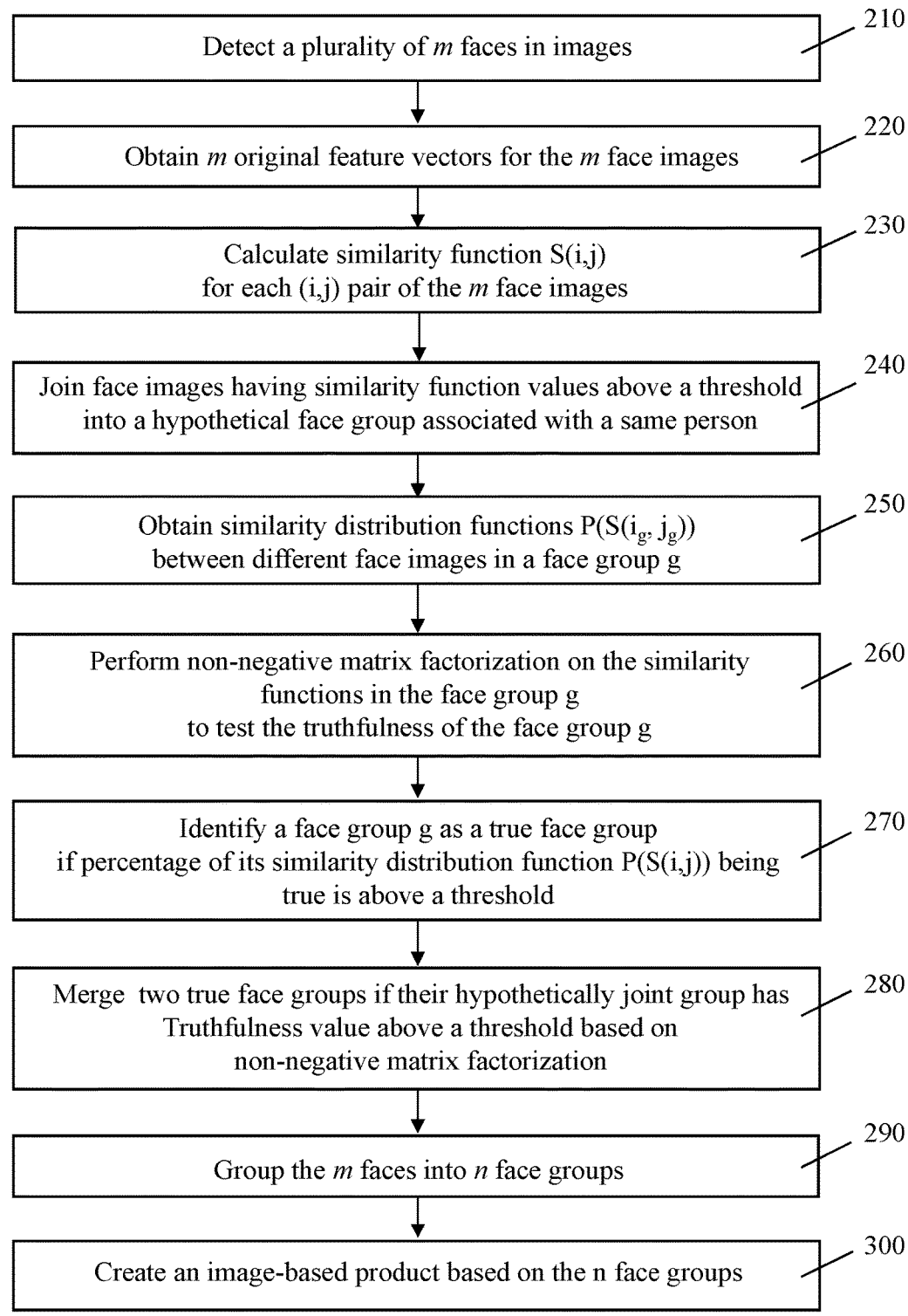
FIG. 2 is a flow diagram for categorizing face images that belong to different persons for image product creation in accordance with the present invention.

Referring to FIGS. 1 and 2, faces are detected and grouped by individual persons before images are selected and incorporated into image products. M number of faces can be detected in the digital images (step 210) by a computer processor (such as the computer processor 36, the computer device 60, or the mobile device 61). The portions of the images that contain the detected faces are cropped out to produce face images, each of which usually includes a single face.

M feature vectors are then obtained by the computer processor for the m face images (step 220). In pattern recognition and machine learning, a feature vector is an n-dimensional vector of numerical features that represent some objects (i.e. a face image in the present disclosure). Representing human faces by numerical feature vectors can facilitate processing and statistical analysis of the human faces. The vector space associated with these vectors is often called the feature space.

Similarity function S(i,j) for each pair of face images i and j among the detected faces are then calculated (step 230) automatically by the computer processor. The disclosed method is generally not restricted to the specific design of similarity function S(i,j). The similar function can be based on inner products of feature vectors from two face image.

$$S(i, j) = \frac{f_i^T f_j}{\|f_i\| \|f_j\|} \quad (1)$$

In another example, two face images can be compared to an etalon set of faces. Similar faces will be similar to the same third party faces and dissimilar with the others. Eigenspace best describing all album faces is calculated. The similarity between the two face images is the exponent of minus distance between the two face feature vectors in this space.

For ease of computation, the similarity function can be scaled to a numeric range between −1 and 1, that is, $-1 \leq S(i,i) \leq 1$. For two identical face images i, S(i,i)=1. In general, the average similarity value between face images of a same person is larger than the average similarity function value between face images of different people.

The similarity value between a pair of face images is related to the probability that the two face images belonging to a same person, but it does not tell which face images together belong to a hypothetical person (identifiable or not). The present method disclosure statistically assesses the probability that a group of face images are indeed faces of the same person. In some embodiments, the values of similarity functions for different pairs of face images are compared to a threshold value T. The face images that are connected through a chain of similarity values higher than T are automatically joined by the computer processor into a hypothetical face group g that potentially belongs to a single person (step 240).

This process is generally known as greedy join. In principle, if ground truth is known, the hypotheses created this way can be assessed using the basic analysis and the overall precision and recall associated with T can be estimated. Since the ground truth in not known, the quality of the hypothesis will be estimated in a different way, as described below. Moreover, by repeating greedy join for different thresholds we can find T associated with the best estimate. Applying greedy join for this threshold results in good face groups.

Once the groups {g} are constructed by greedy join for random values of T, a similarity distribution function {P(S($i_g$, $j_g$))} between different pairs of face images in each face group g is obtained by the computer processor (step 250). Face images in each face group g are characterized by a similar distribution function P(S(i,j)), which is the probability distribution of similarity function values for all different pairs of face images in the face group g. The similarity distribution function {P(S($i_g$, $j_g$))} has a plurality of similarity function values S($i_g$, $j_g$) for different pair of face images i, j.

In some aspects, the use of the similar distribution function P(S(i,j)) to describe a group of face images in the disclosed method is based on several empiric observations: In a given small (<100) set of face images, the similarities inside true face groups (face images of the same person) have the same similarity distribution $P_{true}(S)$, where both i and j are faces in the same face group. The similarities between faces of different persons are distributed with similarity distribution $P_{false}(S)$. For larger face sets, several $P_{true}(S)$ distributions are established. Thus, when $P_{true}$ and $P_{false}$ are known, we can assess how many of the face pairs in a group of face images are of the same persons by solving a linear regression.

Next, non-negative matrix factorization is performed by the computer processor on the similarity distribution function {P(S($i_g$, $j_g$))} to estimate {$P_{true}$, $P_{false}$} and test the truthfulness of the face groups {g} (step 260). The similarity distribution function {P(S($i_g$, $j_g$))} has non-negative values for different S($i_g$, $j_g$)'s. Organized in vectors, they form a non-negative matrix. Non-negative matrix factorization (NMF) is a group of algorithms in multivariate analysis and linear algebra where a matrix V is factorized into two or more non-negative matrices. This non-negativity makes the resulting matrices easier to analyze. NMF in general is not exactly solvable; it is commonly approximated numerically. Specifically, the resulting factor matrices are initialized with random values, or using some problem-tied heuristic. Then, all-but-one of the factors are fixed, and the remaining matrix values are solved, e.g., by regression. This process is continued for each factor matrix. The iterations continue until conversion.

An output of NMF is a matrix having columns $P_{true}$ and $P_{false}$. Another result of NMF is a matrix for determining similarities of the hypothesized face groups to $P_{true}$ and $P_{false}$ distributions. Face groups that are similar to the "true" distribution are accepted as good face groups. Other face groups are ignored. It should be noted that $P_{true}$ and $P_{false}$ distributions can be different for each group of face images. Thus the NMF needs to be performed for every group of user images of interest, such as each user album.

In one general aspect, rather than characterizing each face separately, the presently disclosed method characterizes a face image by a distribution of its similarities to all other face images in the same face group. Thus, when P_true(S) and P_false(S) are known, P(S(i,j)) can be tested to see how close it is to P_true and P_false by solving linear equation. Furthermore, the obtained weights (i.e. precision in data analysis) specify how many pairs in P(S(i,j)) belong to P_true(S) and the rest part of P(S(i,j)) belongs to P_false(S). A face group g is identified as a true face group by the computer processor if percentage of its similarity distribution function P(S(i,j)) being true is above a threshold (step 270). A face group is rejected if it has P(S(i,j)) values that have "truthfulness" less than a predetermined percentage value.

In an often occurring example, a wrong face is highly similar to a single face in a face group, but is dissimilar to all face images in the same face group. In this case, P(S(i,j)) similar to P_false, and the merge between the wrong face and the face group is rejected. In another example, a face has relatively low similarity to all face images in a group, but P(S(i,j)) can still be more similar to P_true and the merge is be accepted. The main benefit of the presently disclosed approach is that it does not define rules on similarities or dissimilarities between a pair of individual faces. The determination if a face image belongs to a face group is statistical and based on the collective similarity properties a whole of face images.

After accepting some of the initial groups, there can still be true face groups and single faces that need to be joined. For every group pair $(g_1, g_2)$, a joint hypothesis group $h_{12}$ is considered ($g_i$ can be a single face). $P_{true}(S)$ and $P_{false}(S)$ are calculated using NMF as described above to test if face pair similarities of $h_{ij}$ has high precision (i.e. similarity functions in the joint face group are true above a predetermined threshold) and, thus, groups $g_i$ and $g_j$ should be merged (step 280). Accurate hypotheses are accepted and the overall recall rises. This enhancement method allows merging faces that associated by relatively low similarity between them, without merging all faces associated with this similarity, as done by the greedy join method.

As a result, n face groups representing n hypothetical persons are obtained from the m face images (step 290).

An image-based product can then then created based in part on the n face groups (step 300). The m face images that are grouped can be extracted from images contained in one or more image albums. A design for an image product can be automatically created by the computer processor 36, the computer device 60, or the mobile device 61 (FIG. 1), then presented to a user 70 or 71 (FIG. 1). For example, the face images of the people who appear most frequently in the user account (indicating are significant to the owner of the user account) can be selected for creating image-product designs over others. The image product creation can also include partial user input or selection on styles, themes, format, or sizes of an image product, or text to be incorporated into an image product. When an order of the image product is received from a user, the design of the image product is sent from the servers 32 to the server 42 in the printing and finishing facilities 40 and 41 (FIG. 1) wherein hardcopies of the image-based products are manufactured. The detection and grouping of face images can significantly reduce time used for design and creation, and improve the accuracy and appeal of an image product. For example, the most important people can be determined and to be emphasized in an image product. Redundant person's face images can be filtered and selected before incorporated into an image product. Irrelevant persons can be minimized or avoided in the image product.

Although the method shown in FIG. 2 and described above can provide a rather effective way of grouping faces for creating image products, it can be improved further incorporating knowledge or intelligence about the general nature and statistics of image products, and about the users (the product designer or orderers, the recipients, and the people who appear in the photos in the image products) of the image products.

Figure 3:
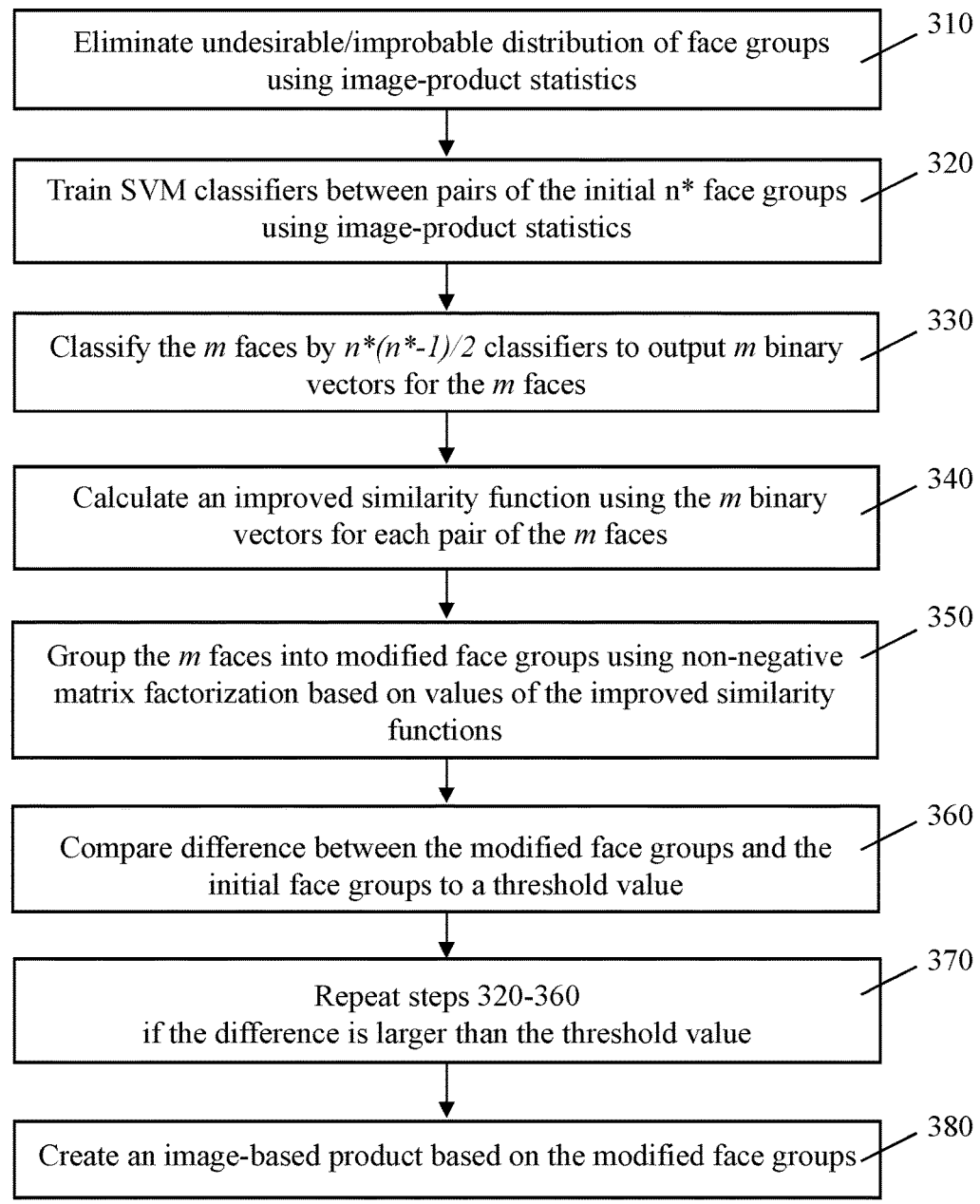
FIG. 3 is a flow diagram for identifying face images in accordance with the present invention.

In some embodiments, referring to FIG. 3, initial face groups are evaluated; the ones having undesirable/improbable distributions are first eliminated using image-product statistics (step 310). Each face can be described by a feature vector of several hundred values. The initial face groups can be obtained in different ways, including the fully automated computer methods such as the one described above in relation to FIG. 2, or partially and fully manual methods with assistance of the users. Leading image product service providers (such as Shutterfly, Inc.) have accumulated vast amount of statistics about the appearance of people's faces in image products. For example, it has been discovered that most family albums or family photobooks typically include 2-4 main characters that appear at high frequencies in each photobook, and the frequencies for other people's faces drastically decrease in the photobook. In another example, the people whose faces appear in pictures ca be assigned as VIP persons and non-VIP persons. It is highly improbable that a non-VIP person will be associated with the largest face group in an image album. In another example, products ordered by the customer are tracked and stored in a database. The largest groups in the image albums are cross referenced with and found to be highly correlated with the most frequent faces in already purchased products.

Next, support vector machine (SVM) classifiers are trained between pairs of the n* face groups ($g_i$, $g_j$) using image-product statistics (step 320). Each of the n* face groups represents a potentially unique person. For the n* face groups, there are n*(n*−1)/2 such classifiers. In the first iteration, the n* face groups are the same as the initial input face groups. As it is described in steps 330-370 below, the number n* of face groups as well as face compositions within the face groups can vary as the face grouping converges in consecutive iterations.

In general, face similarity functions can be built based on different features such as two-dimensional or two-dimensional features obtained with the aid of different filters, biometric distances, image masks, etc. In conventional face categorization technologies, it is often a change to properly define and normalize of similarity or distance between the faces, in the Euclidian (or other) spaces. To address this issue, face similarity functions are defined using SVM in the presently disclosed method. Each image album or photobook can include several hundreds, or even several thousands of faces. SVM is a suitable tool for classifying faces at this scale. The task of face grouping does not use training information, which is different from face recognition. If identities of people in photos of an image album or photo collection are beforehand and have their face images are available, face recognition instead of face grouping can be conducted using SVM.

In the disclosed method, external knowledge on general properties and statistics of faces in image albums or photo collections is combined with methodology of transductive support vector machines (TSVM). TSVM allows using non-labeled (test) data points for SVM training, improving by this the separation of the test data during the learning. A prior knowledge about image albums or collections is that they contain face pairs that are more likely to belong to the same person than other pairs (from different photo collections). Moreover, the frequencies of people's appearances in an image album or a photo collection is usually distributed exponentially, meaning, that main face groups are built by 2-3 main characters and the rest of participants appear only several times at most. Thus, iterative grouping and learning from the most probable recognitions can help classify faces in ambiguous cases. The face models created by the initial grouping can be used to improve the face grouping itself. Other knowledge about an image album and image collection can include titles, keywords, occasions, as well as time and geolocations associated or input in association with each image album or image collection.

Next, the m faces $f_1, \ldots, f_m$ are classified by n*(n*−1)/2 classifiers to output m binary vectors $c_1, \ldots, c_m$ for the m faces (step 330). The binary vectors $c_1, \ldots, c_m$ can have values of 0 or 1: $c_i=1$ if the face is classified as similar to model number i, and otherwise, $c_i=0$.

An improved similarity function is calculated using the m binary vectors for each pair of the m faces (step 340):

$$S(i, j) = \frac{\sum_{k=1}^{n(n-1)/2} XOR(c_{ik}, c_{jk})}{n(n-1)} - 1 \quad (2)$$

The m faces are then grouped into modified face groups using non-negative matrix factorization based on values of the improved similarity functions (step 350). The operation is similar to those described above in step 260 (FIG. 2) but with improved accuracy in face grouping. In this step, the initial face groups in this iteration may be spit or merged to form new face groups or alter compositions in existing face groups.

The difference between the modified face groups {g*} and the initial face groups {g} in the same iteration is calculated (e.g. using norm of similarity matrices for m faces) and compared to a threshold value (step 360). The threshold value can be a constant and/or found empirically. Steps 320-360 are repeated (step 370) if the difference is larger than the threshold value. In other words, the process of training SVM classifiers, calculating binary functions, and grouping based on the binary functions are repeated till the face groups converge to a stable set of groups.

When a stable set of modified face groups {g*} are obtained, they are used to create image products (step 380) such as photobooks, photo calendars, photo greeting cards, or photo mugs. The image product can be automatically created by the computer processor 36, the computer device 60, or the mobile device 61 (FIG. 1), then presented to a user 70 or 71 (FIG. 1), which allows the image product be ordered and made by the printing and finishing facilities 40 and 41 (FIG. 1). The image product creation can also include partial user input or selection on styles, themes, format, or sizes of an image product, or text to be incorporated into an image product. The detection and grouping of face images can significantly reduce time used for design and creation, and improve the accuracy and appeal of an image product.

With the input of knowledge about the image products and users, the modified face groups are more accurate than the method shown in FIG. 2. The modified face groups can be used in different ways when incorporating photos into image products. For example, the most important people (in a family or close friend circle) can be determined and to be emphasized in an image product such as automatic VIPs in the image cloud recognition service. Redundant person's face images (of the same or similar scenes) can be filtered and selected before incorporated into an image product. Unimportant people or strangers can be minimized or avoided in the image product.

Figure 4:
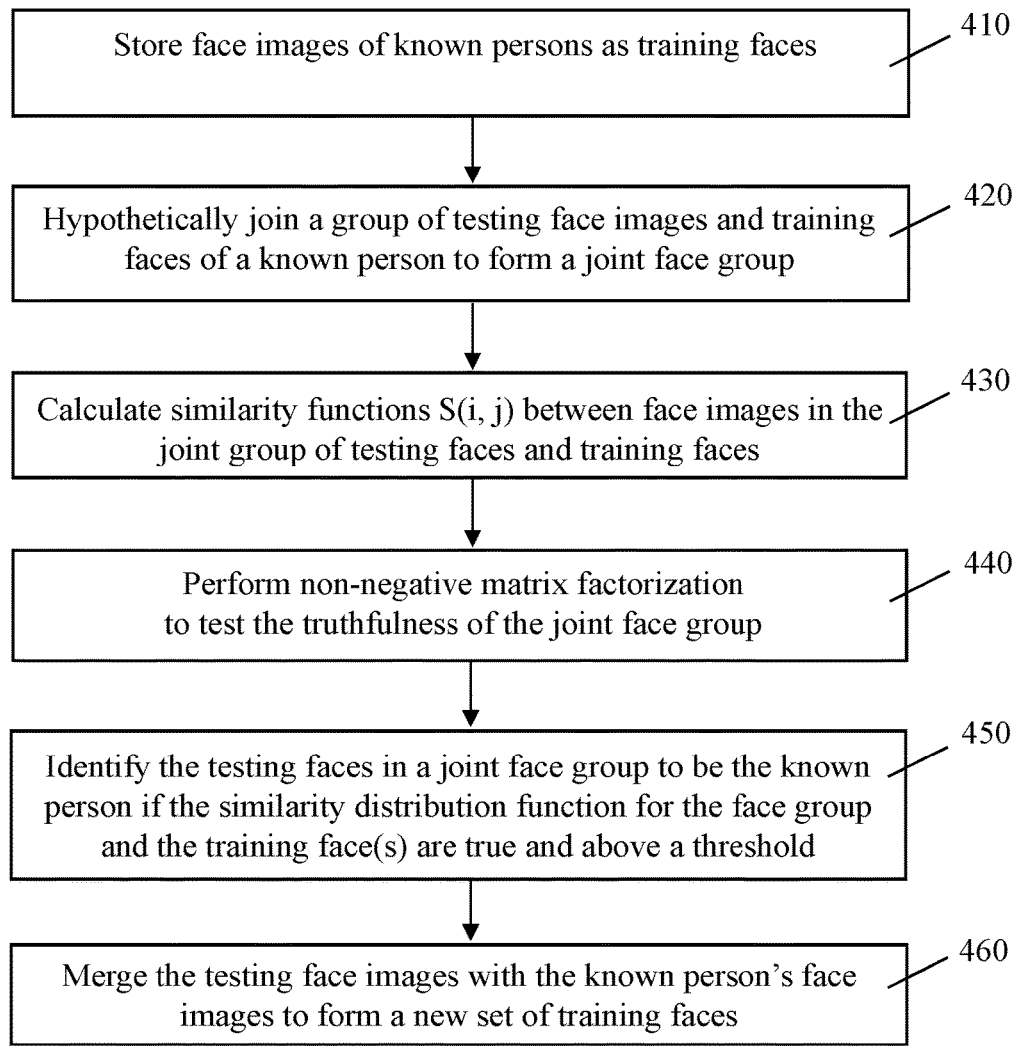
FIG. 4 is a flow diagram for identifying face images in accordance with the present invention.

In some embodiments, referring to FIG. 4, face recognition can include one or more of the following steps. Face images of known persons (denoted sometimes as face models) are stored (step 410) in computer storage in data storage (34 in FIG. 1) or user devices (60, 61 in FIG. 1) as training faces. Examples of the know persons can include a family members and friends of a user the uploaded or stored the images from which the face images are extracted. The face images to be identified in the face groups are called testing faces.

A group of testing faces is then automatically hypothetically joined by a computer processor with a training faces of a known person to form a joint group (step 420). The group of testing faces can be already tested to be true as described in step 270 (in FIG. 2).

Similarity functions S(i,j) are calculated by the computer processor between each pair of testing or training face images in the joint face group (step 430). The collection of the similarity functions S(i,j) in the joint face group are described in a similarity distribution function P(S(i,j)).

Similar to the previous discussions relating to steps 260-270, non-negative matrix factorization is be performed by the computer processor on the similarity function values to estimate $P_{true}(S)$ and $P_{false}(S)$ of the pairs of training and testing face images in the joint face group (step 440). The similarity distribution function P(S(i,j)) is compared to $P_{true}(S)$ and $P_{false}(S)$ and the precision (similarity to $P_{true}$) is tested versus a predetermined threshold (step 440).

The testing faces in the joint face group are identified to be a known person if the similarity distribution function P(S(i,j)) is True at a percentage higher than a threshold (step 450), that is, when the precision is above a threshold.

The group of testing face images can be merged with the known person's face images (step 460), thus producing a new set of training faces for the known person.

As described above, users are having increasingly large number of images in their accounts. Some users now have thousands to tens of thousands of photos taken just from one event, and may have hundreds of thousands to millions of photos in his or her account. Grouping faces and organizing them in a meaningful for creating photo products present new challenges to automated methods of creating image products. One reason for such challenge is that as the number of photos per account increases, the pair comparison type of calculations such as the similarity functional mentioned above increase as a power function of the number of photos in the user account. The power is typically higher than 2 resulted from the number of combinations in the possible comparative calculations, but the number of different faces will also increase as number of photos in a user account. The faces may include the family members and friends of the user, which become more complete in the user's family and friend circle as the number of photos increases, but will also include increased number of casual acquaintances and strangers in the background.

Figure 5:
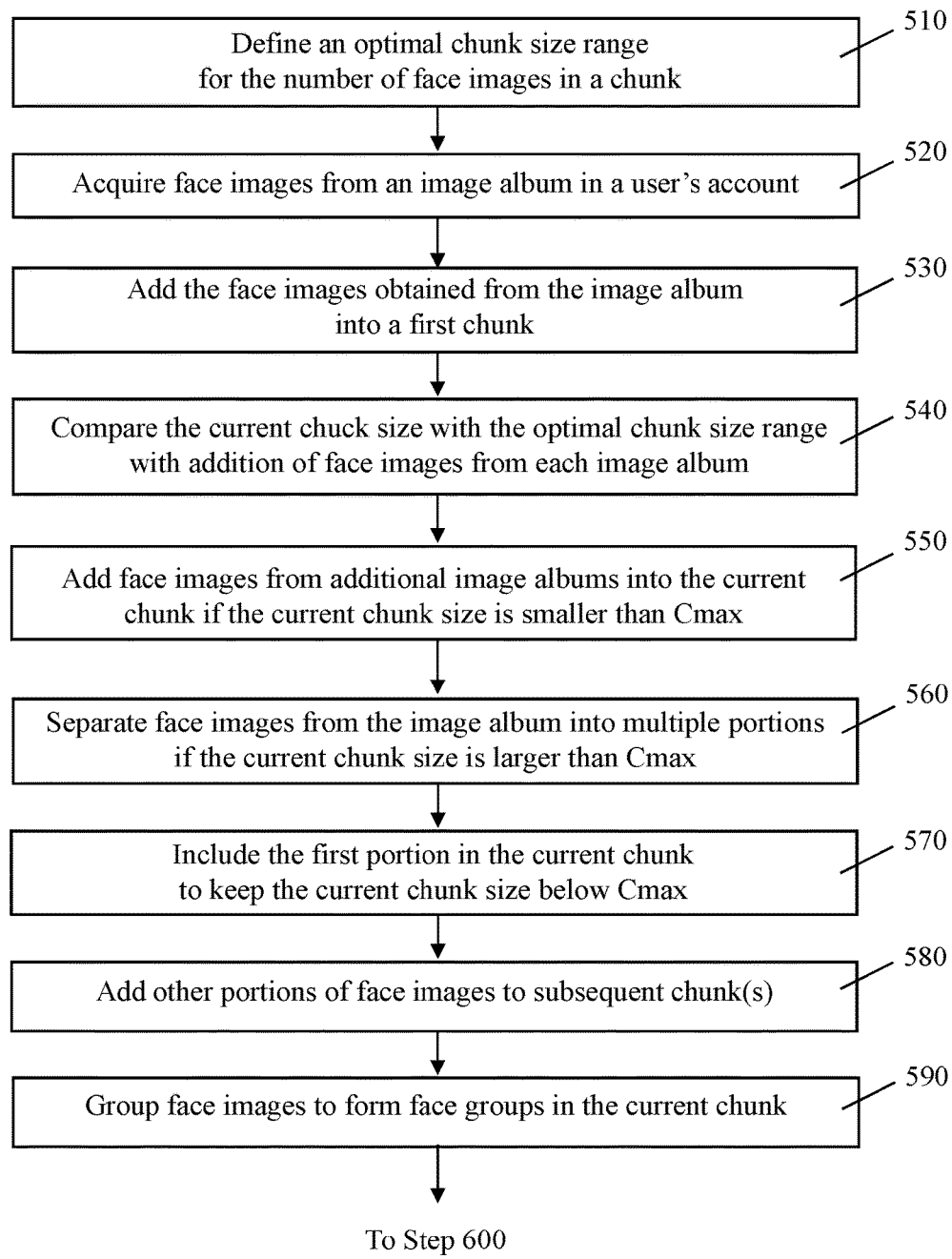
FIG. 5 is a flow diagram for grouping face images for image product creation in user accounts comprising a large number of photos in accordance with the present invention.
Figure 5:
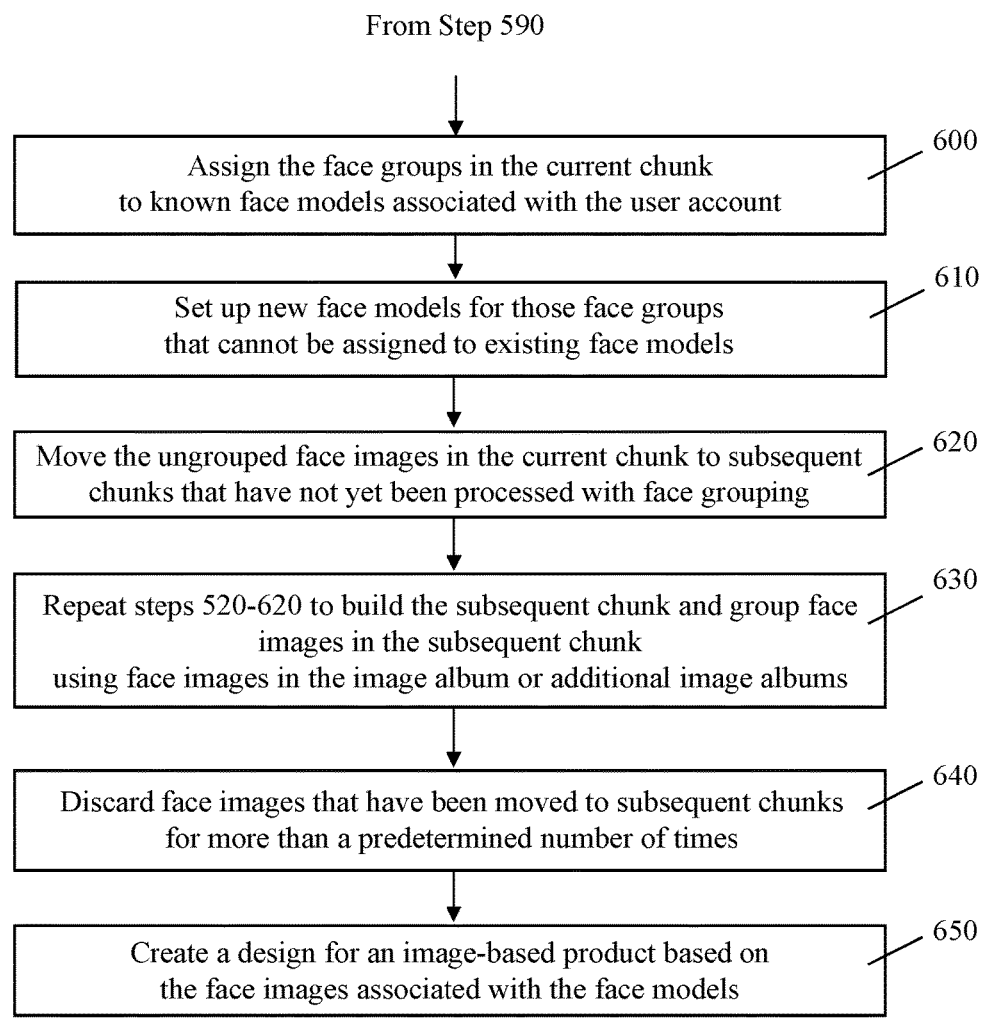

In some embodiments, FIG. 5 discloses an improved method for grouping face images for image product creation in user accounts comprising a large number of photos. The disclosed method analyzes and group face images in a large user account in working batches called chunks. Chunk size refers to the number of photos in a chunk. An optimal chunk size range for a chunk is first defined (step 510). The optimum chuck size can be defined by a minimum Cmin and a maximum Cmax numbers of face images in a chunk.

A user account typically includes multiple albums each including one or more photos, typically arranged based on the occasions in which the photos were taken. The chunk size can be larger than most of the albums and may be smaller than some (the very large ones).

As described above, face images are automatically acquired by a computer processor from an image album in the user account (step 520). The computer processor adds the face images from the image album into a first chunk (step 530). The computer processor can be a computer server (32 in FIG. 1) tasked for the processing functions, a computer processor (36 in FIG. 1) coupled to a cloud image storage system, or a local processor to a user device (60, 61 in FIG. 1).

For each addition of face images from a new image album into the first chunk, the current chuck size is compared with the optimal chunk size (step 540). If the current chunk size is smaller than Cmax, face images from additional image albums is continued to be added to the current chunk (step 550). If the current chunk size becomes larger than Cmax, face images from this image album are separated into multiple portions (step 560). A first portion is included in the current chunk with the current chunk size kept below Cmax (step 570). Other portion(s) of the face images are added to subsequent chunk(s) (step 580). For example, the other portions of face images can be distributed to four or more subsequent chunks.

Once the current chunk is completed, the face images in the current chunk are grouped into face groups (step 590) using methods such as the process disclosed in FIG. 2 (steps 210-290) and the process disclosed in FIG. 3 (steps 310-370). Then the computer processor will attempt to assign the face groups in the current chunk to known face models (step 600). In this step, the known face models are pre-established for the faces identified as the family members, friends, or key members associated with the user account. This step can be implemented using the process disclosed in FIG. 4 in which face models are used as the training faces in steps 410-460.

New face models are set up for those face groups in the current chunk that cannot be assigned to existing face models associated with the user account (step 610). People associated with the new face models can be identified automatically by information such as metadata and image tags or by a user.

The face images that cannot be grouped in the current chunk are moved to one or more subsequent chunks that have not been processed for face grouping yet (step 620). The purpose of this step is to accumulate these ungrouped faces until there is enough number of sufficiently quality face images to allow them to be grouped.

Steps 520-620 are then repeated to first build the subsequent chunks of face images, and then group the face images in the subsequent chunk (step 630). The face images can be acquired from the same image album or additional image albums. The face groups in the subsequent chunk are then assigned to existing face models, and if that is not successful, new face models are set up for the unassigned face groups. Again, ungrouped face images can be moved to subsequent chunks to be analyzed with other face images later.

If ungrouped face images have been moved down more than a predetermined number of times, the people corresponding to these faces are likely to be of strangers or casual acquaintances that are not important to the owner of the user account. Those images are discarded (step 640). This step is especially important for large user account because when the number of images increases, the number of face images from strangers and people unimportant to the user increases significantly, which often become a heavy burden to face grouping computations. By effectively removing faces of strangers and acquaintances, computation efficiency of the computer processor in face grouping and efficiency in computer storage are significantly increased.

Once the face images in the user account are grouped and assigned to face models, an image-based product can be created based in part on the face images associated with the face models (step 650), including the known face models and the new face models. The face images can be from the first chunk or subsequent chunks. For example, the face images of the people who appear most frequently in the user account (indicating are significant to the owner of the user account) can be selected for creating image-product designs over others. A design for an image product can be automatically created by the computer processor 36, the computer device 60, or the mobile device 61 (FIG. 1), then presented to a user 70 or 71 (FIG. 1). The image product creation can also include partial user input or selection on styles, themes, format, or sizes of an image product, or text to be incorporated into an image product. The detection and grouping of face images can significantly reduce time used for design and creation, and improve the accuracy and appeal of an image product. For example, the most important people can be determined and to be emphasized in an image product. When an order of the image product is received from a user, the design of the image product is sent from the servers 32 to the server 42 in the printing and finishing facilities 40 and 41 (FIG. 1) wherein hardcopies of the image-based products are manufactured.

The disclosed methods can include one or more of the following advantages. The disclosed method can automatically group faces in user account that contain a large number of faces in photos that are difficult to be processed using conventional technologies. The disclosed method is scalable to any number of photos in user account. The disclosed method is compatible to different face grouping techniques including methods based on training faces of known persons.

The disclosed face grouping method does not rely on the prior knowledge about who are in the image album or photo collection, and thus are more flexible and easier to use. The disclosed face grouping method has the benefits of improved accuracy in grouping faces (more accurate merging and splitting), improved relevance of grouping faces to image products, and improved relevance of grouping faces to families and close friends.

It should be understood that the presently disclosed systems and methods can be compatible with different devices or applications other than the examples described above. For example, the disclosed method is suitable for desktop, tablet computers, mobile phones and other types of network connectable computer devices.

What is claimed is:

1. A computer-implemented method of grouping faces in large user account for creating an image product, comprising:

selecting, by a computer processor, a first portion of face images from a user's account to add to a first chunk, wherein the first portion of face images is selected to keep chuck size of the first chunk in an optimal chunk size range;

automatically grouping face images in the first chunk by the computer processor to form face groups;

assigning at least some of the face groups in the first chunk to known face models associated with the user account;

moving the ungrouped face images in the first chunk to one or more subsequent chunks that have not been processed with face grouping;

discarding ungrouped face images that have been moved to subsequent chunks for more than a predetermined number of times; and creating a design for an image-based product based at least in part on the face images in the first chunk associated with the face models.

2. The computer-implemented method of claim 1, wherein the step of selecting, by a computer processor, a first portion of face images from a user's account to add to a first chunk comprises:
   comparing the chuck size of the first chunk with a maximum chuck value for an optimal chunk size range by the computer processor;
   if the chunk size of the first chuck is smaller than the maximum chuck value, keeping the face images from the user's account in the first chunk;
   if the chunk size of the first chuck is larger than the maximum chuck value, automatically separating the face images from the user's account into the first portion and the one or more second portions by the computer processor;
   adding the first portion in the first chunk while keeping the current chunk size below the maximum chuck value; and
   automatically moving one or more second portions of face images from the user's account to one or more subsequent chunks by the computer processor.

3. The computer-implemented method of claim 1, further comprising:
   setting up new face models by the computer processor for at least some of the face groups that cannot be assigned to existing face models, wherein the design for an image-based product is created based on the face images associated with the known face models and the new face models.

4. The computer-implemented method of claim 1, further comprising:
   repeating steps from selecting a first portion of face images from a user's account to assigning at least some of the face groups in a second chunk subsequent to the first chunk;
   assigning at least some of the face groups in the second chunk to known face models associated with the user account; and
   creating the design for the image-based product based at least in part on the face images in the first chunk and the second chunk associated with the face models.

5. The computer-implemented method of claim 1, wherein the step of automatically grouping face images in the first chunk comprises:
   receiving an initial set of n* face groups in the face images in the first chunk, wherein n* is a positive integer bigger than 1;
   training classifiers between pairs of face groups in the initial set of face groups using image-product statistics;
   classifying the plurality of face images by $n^*(n^*-1)/2$ classifiers to output binary vectors for the face images by the computer processor;
   calculating a value for a similarity function using the binary vectors for each pair of the face images; and
   grouping the face images in the first chunk into modified face groups based on values of the binary similarity functions by the computer processor.

6. The computer-implemented method of claim 5, further comprising:
   comparing a difference between the modified face groups and the initial face groups to a threshold value, wherein the image product is created based at least in part on the modified face groups if the difference is smaller than the threshold value.

7. The computer-implemented method of claim 5, wherein there are an integer m number of face images in the plurality of face images, wherein the step of classifying the plurality of face images by $n^*(n^*-1)/2$ classifiers outputs m number of binary vectors.

8. The computer-implemented method of claim 5, wherein the face images are grouped into modified face groups using non-negative matrix factorization based on values of the improved similarity functions.

9. A computer-implemented method of grouping faces in large user account for creating an image product, comprising:
   selecting, by a computer processor, a first portion of face images from a user's account to add to a first chunk, wherein the first portion of face images is selected to keep chuck size of the first chunk in an optimal chunk size range;
   automatically grouping face images in the first chunk by the computer processor to form face groups, wherein the step of automatically grouping face images in the first chunk comprises:
      calculating similarity functions between pairs of face images in the first chunk by the computer processor;
      joining face images that have values of the similarity functions above a predetermined threshold into a hypothetical face group, wherein the face images in the hypothetical face group hypothetically belong to a same person;
      conducting non-negative matrix factorization on values of the similarity functions in the hypothetical face group to test truthfulness of the hypothetical face group; and
      identifying the hypothetical face group as a true face group if a percentage of the associated similarity functions being true is above a threshold based on the non-negative matrix factorization;
   assigning at least some of the face groups in the first chunk to known face models associated with the user account; and
   creating a design for an image-based product based at least in part on the face images in the first chunk associated with the face models.

10. The computer-implemented method of claim 9, further comprising:
    rejecting the hypothetical face group as a true face group if a percentage of the associated similarity functions being true is below a threshold.

11. The computer-implemented method of claim 9, wherein the step of conducting non-negative matrix factorization comprises:
    forming a non-negative matrix using values of similarity functions between all different pairs of face images in the hypothetical face group,
    wherein the non-negative matrix factorization is conducted over the non-negative matrix.

12. The computer-implemented method of claim 9, wherein the similarity functions in the hypothetical face group are described in a similarity distribution function, wherein the step of non-negative matrix factorization outputs a True similarity distribution function and a False similarity distribution function.

13. The computer-implemented method of claim 9, wherein every pair of face images in the hypothetical face group has a similarity function above the predetermined threshold.

14. The computer-implemented method of claim 9, further comprising:
    joining two true face groups to form a joint face group;

conducting non-negative matrix factorization on values of similarity functions in the joint face group; and merging the two true face groups if a percentage of the associated similarity functions being true is above a threshold in the joint face group.

15. A computer-implemented method of grouping faces in large user account for creating an image product, comprising:

selecting, by a computer processor, a first portion of face images from a user's account to add to a first chunk, wherein the first portion of face images is selected to keep chuck size of the first chunk in an optimal chunk size range;

automatically grouping face images in the first chunk by the computer processor to form face groups;

assigning at least some of the face groups in the first chunk to known face models associated with the user account; and creating a design for an image-based product based at least in part on the face images in the first chunk associated with the face models, wherein the step of assigning at least some of the face groups in the first chunk to known face models comprises:

storing training faces associated with the known face models of known persons in a computer storage;

joining the face images in the first chunk with a group of training faces associated with the known face models;

calculating similarity functions between pairs of the face images or the training faces in the joint group by a computer processor;

conducting non-negative matrix factorization on values of the similarity functions in the joint face group to test truthfulness of the joint face group; and identifying the face images in the first chunk that belong to the known face models if a percentage of the associated similarity functions being true is above a threshold based on the non-negative matrix factorization.

16. The computer-implemented method of claim 15, further comprising:

merging the face images with the training faces of the known face model to form a new set of training faces for the known face model.

17. The computer-implemented method of claim 15, wherein the step of conducting non-negative matrix factorization comprises:

forming a non-negative matrix using values of similarity functions between all different pairs of the face images and the training faces in the joint face group, wherein the non-negative matrix factorization is conducted over the non-negative matrix.

18. The computer-implemented method of claim 15, wherein the similarity functions in the joint face group are described in a similarity distribution function, wherein the step of non-negative matrix factorization outputs a True similarity distribution function and a False similarity distribution function.

19. The computer-implemented method of claim 15, wherein the step of identifying comprises:

comparing the similarity distribution function to the True similarity distribution function and the False similarity distribution function.

* * * * *